(12) United States Patent
Liu et al.

(10) Patent No.: US 11,341,967 B2
(45) Date of Patent: May 24, 2022

(54) METHOD AND APPARATUS FOR VOICE INTERACTION

(71) Applicant: Baidu Online Network Technology (Beijing) Co., Ltd., Beijing (CN)

(72) Inventors: Dongli Liu, Beijing (CN); Xiaocheng Dai, Beijing (CN); Jian Peng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 176 days.

(21) Appl. No.: 16/812,110

(22) Filed: Mar. 6, 2020

(65) Prior Publication Data

US 2021/0020174 A1 Jan. 21, 2021

(30) Foreign Application Priority Data

Jul. 15, 2019 (CN) .......................... 201910637711.2

(51) Int. Cl.
*G10L 15/22* (2006.01)
*G06F 3/16* (2006.01)
*G10L 15/08* (2006.01)

(52) U.S. Cl.
CPC .............. *G10L 15/22* (2013.01); *G06F 3/167* (2013.01); *G10L 15/08* (2013.01); *G10L 2015/088* (2013.01); *G10L 2015/223* (2013.01); *G10L 2015/225* (2013.01)

(58) Field of Classification Search
CPC ......... G10L 15/22; G10L 15/00; G10L 15/01; G10L 15/08; G10L 15/1815; G10L 15/20; G10L 15/26; G10L 15/28; G10L 2015/0631–0638; G10L 2015/221–228

USPC ..... 704/270.1, 270, 275, 231, 245, 251, 255
See application file for complete search history.

(56) References Cited

U.S. PATENT DOCUMENTS

| | | | | |
|---|---|---|---|---|
| 10,950,228 B1* | 3/2021 | Tan | ................... | G10L 13/08 |
| 2016/0189717 A1* | 6/2016 | Kannan | ................... | G06F 3/167 |
| | | | | 704/275 |
| 2017/0352352 A1* | 12/2017 | Wang | ................... | G10L 25/72 |
| 2019/0179610 A1* | 6/2019 | Aiken | ................... | H04M 1/72415 |
| 2020/0301657 A1* | 9/2020 | Edmonds | ................... | G06F 16/438 |

FOREIGN PATENT DOCUMENTS

| | | |
|---|---|---|
| CN | 106055605 A | 10/2016 |
| CN | 107103795 A | 8/2017 |
| CN | 107300970 A | 10/2017 |
| CN | 109509485 A | 3/2019 |
| CN | 109710748 A | 5/2019 |
| JP | 2001183155 | 7/2001 |
| JP | 2013020220 | 1/2013 |
| JP | 2015195998 | 11/2015 |

* cited by examiner

*Primary Examiner* — Qi Han
(74) *Attorney, Agent, or Firm* — Knobbe Martens Olson & Bear LLP

(57) ABSTRACT

A method for a voice interaction is provided according to embodiments of the disclosure, the method belonging to the field of smart devices. The method may include: receiving an external input; checking a current time in response to the external input; calling a voice program; and raising a question according to the current time and the called voice program, and playing the called voice program. The method and apparatus for a voice interaction may perform more immersive interaction with a user, thereby improving the user experience.

10 Claims, 3 Drawing Sheets

METHOD AND APPARATUS FOR VOICE INTERACTION

CROSS-REFERENCE TO RELATED APPLICATIONS

This application claims priority to Chinese Patent Application No. 201910637711.2, filed on Jul. 15, 2019, titled "Method and Apparatus for Voice Interaction," which is hereby incorporated by reference in its entirety.

TECHNICAL FIELD

The present disclosure relates to a smart device, in particular to a method and apparatus for a voice interaction.

BACKGROUND

At present, for a smart apparatus for a voice interaction (including a smart speaker and a smart robot), if a content producer or editor wants to interact with a user during an audio program playing process, a question may be raised to the user. However, the user of the smart apparatus for a voice interaction has little interaction with the apparatus. The question raised by the smart apparatus for a voice interaction is not strongly related to time and a storyline, so the user is not immersed enough.

SUMMARY

An object of embodiments of the present disclosure is to provide a method and apparatus for a voice interaction, which may have a more immersive interaction with a user and thus improve the user experience.

To implement above object, a method for a voice interaction is provided according to embodiments of the disclosure. The method includes: receiving an external input; checking a current time in response to the external input; calling a voice program; and raising a question according to the current time and the called voice program, and playing the called voice program.

Optionally, after raising a question, the method further comprises: receiving an external voice input; determining whether the external voice input matches an answer to the raised question; and outputting voice prompt information when the external voice input matches the answer to the raised question.

Optionally, the raising a question according to the current time and the called voice program, and playing the called voice program comprises: playing the called voice program first, and then raising a question according to the current time and the called voice program after the called voice program is played, or raising the question according to the current time and the called voice program first, and then playing the called voice program after the question is raised, or raising the question according to the current time and the called voice program while the called voice program is played.

Optionally, the determining whether the external voice input matches an answer to the raised question comprises: determining whether the external voice input comprises a keyword in an answer to the raised question; and determining the external voice input matching the answer to the raised question when the external voice input comprises the keyword in the answer to the raised question.

Optionally, the raising a question according to the current time and the called voice program comprises: raising a question corresponding to the called voice program when the current time is not within a preset period of time; and raising a question corresponding to the called voice program and the preset period of time when the current time is within the preset period of time.

An apparatus for a voice interaction is further provided according to embodiments of the disclosure. The apparatus includes: a receiving unit, a checking unit, a processing unit and a playing unit, where the receiving unit is configured for receiving an external input; the checking unit is configured for checking a current time in response to the external input; the processing unit is configured for calling a voice program; and the playing unit is configured for raising a question according to the current time and the called voice program, and playing the called voice program.

Optionally, the receiving unit is further configured for receiving an external voice input after the question is raised; the processing unit is further configured for determining whether the external voice input matches an answer to the raised question; and the playing unit is further configured for outputting voice prompt information when the external voice input matches the answer to the raised question.

Optionally, the raising a question according to the current time and the called voice program, and playing the called voice program comprises: playing the called voice program first, and then raising a question according to the current time and the called voice program after the called voice program is played, or raising the question according to the current time and the called voice program first, and then playing the called voice program after the question is raised, or raising the question according to the current time and the called voice program while the called voice program is played.

Optionally, the determining whether the external voice input matches an answer to the raised question comprises: determining whether the external voice input comprises a keyword in an answer to the raised question; and determining the external voice input matching the answer to the raised question when the external voice input comprises the keyword in the answer to the raised question.

Optionally, the raising a question according to the current time and the called voice program comprises: raising a question corresponding to the called voice program when the current time is not within a preset period of time; and raising a question corresponding to the called voice program and the preset period of time when the current time is within the preset period of time.

By means of the technical solution, with the method and apparatus for a voice interaction provided by the present disclosure, an external input is received; then a current time is checked in response to the external input; then a voice program is called; and finally a question is raised according to the current time and the called voice program, and the called voice program is played. Therefore, more immersive interaction with the user is realized, and the user experience is thus improved.

Other features and advantages of the embodiments of the present disclosure will be described in detail thereinafter.

BRIEF DESCRIPTION OF THE DRAWINGS

The accompanying drawings are used to provide a further understanding of the embodiments of the present disclosure, and constitute a part of the specification. Together with the description of the embodiments, the accompanying drawings are used to explain the embodiments of the present disclosure, but not to limit the embodiments of the present disclosure. In the drawings.

DETAILED DESCRIPTION OF EMBODIMENTS

Embodiments of the present disclosure will be described below in detail with reference to the accompanying drawings. It should be appreciated that the specific embodiments described herein are merely used for explaining the embodiments of the present disclosure, rather than limiting the embodiments of present disclosure.

Figure 1:
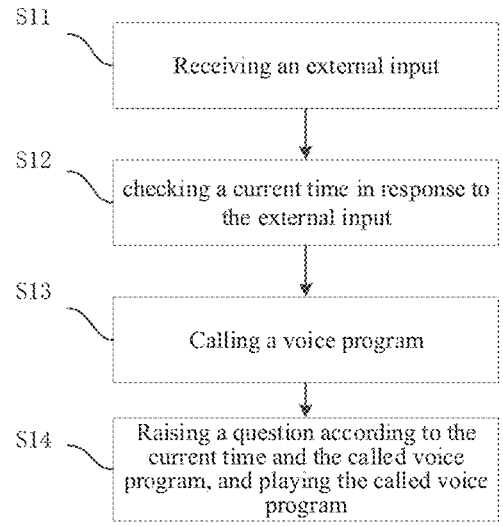
FIG. 1 is a flowchart of a method for a voice interaction according to an embodiment of the present disclosure.

FIG. 1 is a flowchart of a method for a voice interaction according to an embodiment of the present disclosure. As shown in FIG. 1, the method includes:

Step S11: receiving an external input;

Step S12: checking a current time in response to the external input;

Step S13: calling a voice program; and

Step S14: raising a question according to the current time and the called voice program, and playing the called voice program.

In step S11, an external input is received. In this regard, the external input may be an external input of a key, or an external input of voice. The external input of voice may be an instruction related to requesting an item, such as "I want to listen to a story", or an instruction not related to requesting an item, such as "Play with me for a while".

In step S12, in response to the external input, a current time for example, 8 am or 9 pm, is checked.

In step S13, a voice program is called. The voice program may be stored in the apparatus for a voice interaction in advance, or a real person records and stores the voice program as an audio.

In step S14, there may be multiple cases with regard to the sequence of the voice program and the question. The first one is to play the called voice program first, and then raise the question according to the current time and the called voice program after the called voice program is played; the second one is to raise the question according to the current time and the called voice program first, and then play the called voice program after the question is raised; and the third one is to raise the question according to the current time and the called vice program while the called voice program is played. In addition, if the played voice program corresponds to a specific question for a period of time in which the current time is, the specific question is raised, which will be described in detail thereinafter. The raised question may be synthesized and outputted by a machine using a question text stored in an apparatus for a voice interaction, or outputted using the question recorded by a real person as an audio and stored in the apparatus for a voice interaction.

Figure 2:
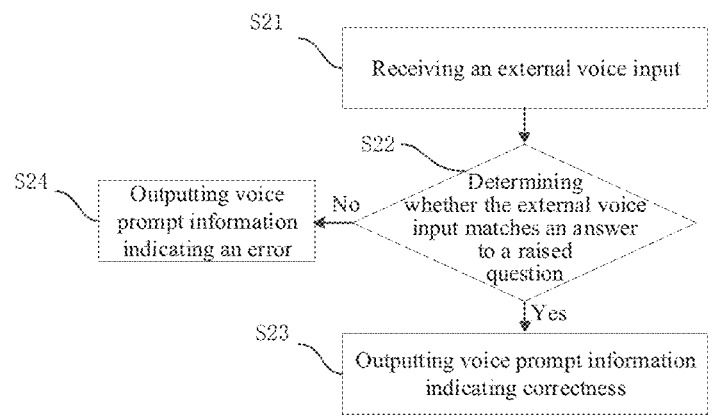
FIG. 2 is a flowchart of a method for a voice interaction according to another embodiment of the present disclosure.

FIG. 2 is a flowchart of a method for a voice interaction according to another embodiment of the present disclosure. As shown in FIG. 2, after raising a question, the method further includes:

Step S21: receiving an external voice input;

Step S22: determining whether the external voice input matches an answer to the raised question;

Step S23: outputting voice prompt information indicating correctness when the external voice input matches the answer to the raised question; and Step S24: outputting voice prompt information indicating an error when the external voice input does not match the answer to the raised question.

In step S21, the external voice input received after the question is raised defaults to an answer of a user to the raised question. When the apparatus for a voice interaction raises the question, a microphone may be automatically turned on, and the user may answer directly. If the microphone cannot be turned on automatically, the user may manually turn on the microphone and then answer, after which, the apparatus for a voice interaction can obtain the answer from the user.

In step S22, whether the external voice input matches the answer to the raised question is determined. There is a case where there is only one correct answer to the raised question. For example, the raised question is "What is the next sentence of "white feathers float on green water", then there is only one correct answer, that is "red-webbed feet stir in blue dye". Therefore, only by saying this correct answer, the answer to the raised question can be matched. If there is more than one correct answer to the raised question, multiple answers may be stored in advance.

In step S23 and step S24, if the answer of the user matches the answer to the raised question, a voice prompt message indicating correctness may be given, and the user is reminded to enter the next program or perform other functions. If the answer of the user does not match the answer to the raised question, an answer prompt may be given to guide the user to answer again. After a limited number of prompts, if the answer of the user still does not match the answer to the raised question, the answer may be posted directly, while the user is reminded to enter the next program or perform other functions.

Figure 3:
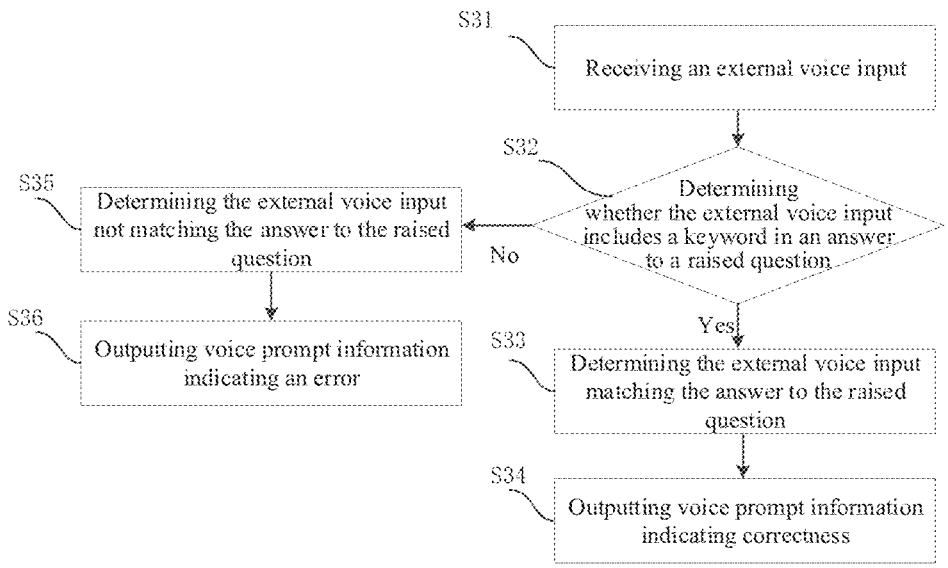
FIG. 3 is a flowchart of a method for a voice interaction according to another embodiment of the present disclosure.

FIG. 3 is a flowchart of a method for a voice interaction according to another embodiment of the present disclosure. As shown in FIG. 3, the method further includes:

Step S31: receiving an external voice input;

Step S32: determining whether the external voice input includes a keyword in an answer to a raised question;

Step S33: determining the external voice input matching the answer to the raised question when the external voice input includes the keyword in the answer to the raised question;

Step S34: outputting voice prompt information indicating correctness when the external voice input matches the answer to the raised question;

Step S35: determining the external voice input not matching the answer to the raised question when the external voice input does not include the keyword in the answer to the raised question; and Step S36: outputting voice prompt information indicating an error when the external voice input does not match the answer to the raised question.

An embodiment of the present disclosure provides a matching method for the case where there is more than one correct answer to the raised question.

In step S32, whether the external voice input includes the keyword in the answer to the raised question is determined.

For example, if the raised question is "Who is the king of beasts?", The correct answer is "Tiger", and the keyword is "Tiger". Whether the external voice input contains the "Tiger" is determined.

In step S33 and step S35, if the external voice input is "Tiger", "Big tiger", or "it is tiger", it may be determined that the input matches the answer to the raised question as long as the input includes the "Tiger". If the input does not include the "Tiger", such input does not match the answer to the raised question.

The specific implementations of other steps are similar to the present embodiment, and are not repeated here.

Figure 4:
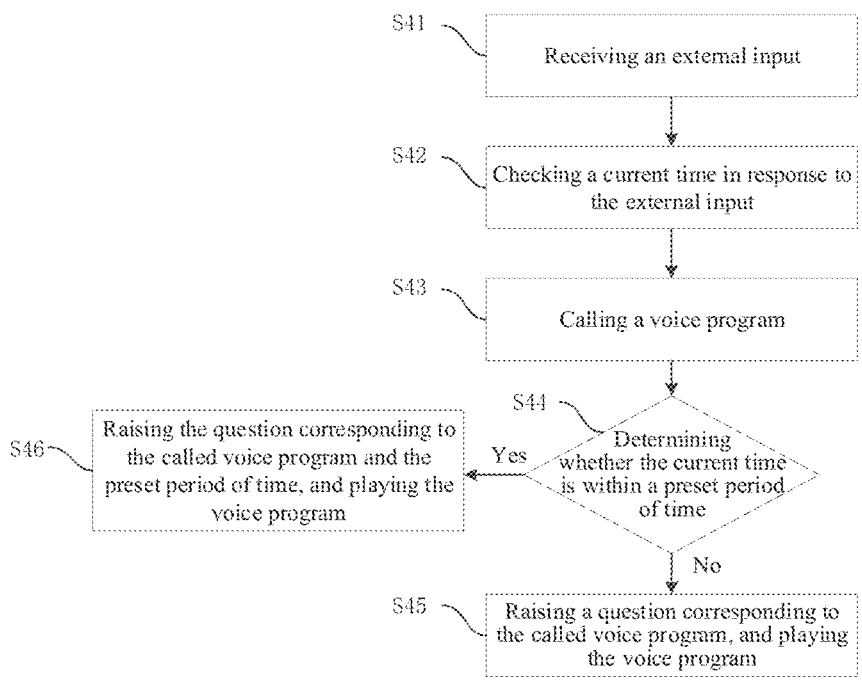
FIG. 4 is a flowchart of a method for a voice interaction according to another embodiment of the present disclosure.

FIG. 4 is a flowchart of a method for a voice interaction according to another embodiment of the present disclosure. As shown in FIG. 4, the method includes:

Step S41: receiving an external input;

Step S42: checking a current time in response to the external input;

Step S43: calling a voice program;

Step S44: determining whether the current time is within a preset period of time;

Step S45: raising a question corresponding to the called voice program and playing the voice program when the current time is not within a preset period of time; and Step S46, raising the question corresponding to the called voice program and corresponding to the preset period of time, and playing the voice program when the current time is within the preset period of time.

In the present embodiment, adjustments of the raised question according to the period of time in which the played voice program is will be described in detail.

Specifically, in step S44, whether the current time is in a preset period of time is determined. For example, the preset period of time is 7-8 am or 9-11 pm. Such period of time is generally just before getting up or going to bed. If the current time is within the preset period of time, a question different from those in other periods of times will be raised.

In step S45 and step S46, for example, when the user listens to the "story of good toothbrushing habits", a raised question may be "Should I often brush my teeth?" when the current time is not within the preset period of time; and the raised question may be a specific question such as "should I brush my teeth in the morning?" or should I brush my teeth in the evening?", when the current time is within the preset period of time. These questions are strongly related to a special preset period of time. For the sake of clarity, the preset period of time is only exemplified from 7 to 8 am in the morning or from 9 to 11 in the evening, but such period of time is only an example, and is not limited in the present disclosure.

The specific implementations of other steps are similar to the present embodiment, and are not repeated here.

Figure 5:
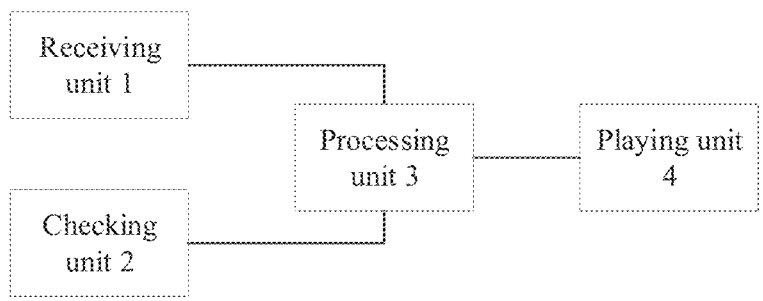
FIG. 5 is a schematic structural diagram of an apparatus for a voice interaction according to an embodiment of the present disclosure.

FIG. 5 is a schematic structural diagram of an apparatus for a voice interaction according to an embodiment of the present disclosure. As shown in FIG. 5, the apparatus includes: a receiving unit 1, a checking unit 2, a processing unit 3 and a playing unit 4, where the receiving unit 1 is configured for receiving an external input; the checking unit 2 is configured for checking a current time in response to the external input; the processing unit 3 is configured for calling a voice program; and the playing unit 4 is configured for raising a question according to the current time and the called voice program, and playing the called voice program.

Optionally, after a question is raised, the receiving unit 1 is further configured for receiving an external voice input; the processing unit 3 is further configured for determining whether the external voice input matches an answer to the raised question; and the playing unit 4 is further configured for outputting voice prompt information when the external voice input matches the answer to the raised question.

Optionally, the raising a question according to the current time and the called voice program, and playing the called voice program includes: playing the called voice program first, and then raising a question according to the current time and the called voice program after the called voice program is played, or raising a question according to the current time and the called voice program first, and then playing the called voice program after the question is raised, or raising a question according to the current time and the called voice program while the called voice program is played.

Optionally, the determining whether the external voice input matches an answer to the raised question includes: determining whether the external voice input includes a keyword in an answer to the raised question; and determining the external voice input matching the answer to the raised question when the external voice input includes the keyword in the answer to the raised question.

Optionally, the raising a question according to the current time and the called voice program includes: raising a question corresponding to the called voice program when the current time is not within a preset period of time; and raising a question corresponding to the called voice program and the preset period of time when the current time is within the preset period of time.

Embodiments of the apparatus for a voice interaction are similar to embodiments of the method for a voice interaction, and details thereof are thus not described herein again.

By means of the technical solution, with the method and apparatus for a voice interaction provided by the present disclosure: an external input is received; then a current time is checked in response to the external input; then a voice program is called; and finally a question is raised according to the current time and the called voice program, and the called voice program is played. Therefore, more immersive interaction with the user is realized, and the user experience is thus improved.

The optional implementations of some embodiments of the present disclosure have been described above in detail with reference to the accompanying drawings. However, the embodiments of the present disclosure are not limited to the specific details in the foregoing implementations. Within the scope of the technical concept of the embodiments of the present disclosure, the technical solution in the embodiments of present disclosure may be subject to various simple modifications, and such simple modifications all belong to the scope of the embodiments of the present disclosure.

It should be also noted that the specific technical features described in the above embodiments may be combined with each other in any suitable way on a non-conflict basis. In order to avoid unnecessary repetition, the embodiments of the present disclosure do not separately describe all possible combinations.

Those skilled in the art may understand that all or part of the steps of implementing the method embodiments may be completed by using a program to instruct related hardware. The program is stored in a storage medium including instructions to enable a microcontroller, a chip or a processor to execute all or part of the steps of the method described in the embodiments of the present disclosure. The storage medium includes a U disk, a mobile hard disk, a read-only memory (ROM), a random access memory (RAM), a magnetic disk, or an optical disk and other media capable of storing program codes.

In addition, any combination of various implementations of the embodiments according to the present disclosure may be made as long as the combination does not deviate from the idea of the embodiments of the present disclosure, and such combination should be regarded as a content disclosed by the embodiments of the present disclosure.

What is claimed is:

1. A method for a voice interaction, the method comprising:
    receiving an external input;
    checking a current time in response to the external input;
    calling a voice program; and
    raising a question according to the current time and the called voice program, and playing the called voice program.

2. The method for a voice interaction according to claim 1, wherein after raising a question, the method further comprises:
    receiving an external voice input;
    determining whether the external voice input matches an answer to the raised question; and
    outputting voice prompt information when the external voice input matches the answer to the raised question.

3. The method for a voice interaction according to claim 2, wherein the determining whether the external voice input matches an answer to the raised question comprises:
    determining whether the external voice input comprises a keyword in an answer to the raised question; and
    determining the external voice input matching the answer to the raised question when the external voice input comprises the keyword in the answer to the raised question.

4. The method for a voice interaction according to claim 1, wherein the raising a question according to the current time and the called voice program, and playing the called voice program comprises:
    playing the called voice program first, and then raising a question according to the current time and the called voice program after the called voice program is played, or
    raising the question according to the current time and the called voice program first, and then playing the called voice program after the question is raised, or
    raising the question according to the current time and the called voice program while the called voice program is played.

5. The method for a voice interaction according to claim 1, wherein the raising a question according to the current time and the called voice program comprises:
    raising a question corresponding to the called voice program when the current time is not within a preset period of time; and
    raising a question corresponding to the called voice program and the preset period of time when the current time is within the preset period of time.

6. An apparatus for a voice interaction, comprising:
    at least one processor; and
    a memory storing instructions, wherein the instructions when executed by the at least one processor, cause the at least one processor to perform operations, the operations comprising:
    receiving an external input;
    checking a current time in response to the external input;
    calling a voice program; and
    raising a question according to the current time and the called voice program, and playing the called voice program.

7. The apparatus for a voice interaction according to claim 6, wherein the operations further comprise:
    receiving an external voice input after the question is raised;
    determining whether the external voice input matches an answer to the raised question; and
    outputting voice prompt information when the external voice input matches the answer to the raised question.

8. The apparatus for a voice interaction according to claim 7, wherein the determining whether the external voice input matches an answer to the raised question comprises:
    determining whether the external voice input comprises a keyword in an answer to the raised question; and
    determining the external voice input matching the answer to the raised question when the external voice input comprises the keyword in the answer to the raised question.

9. The apparatus for a voice interaction according to claim 6, wherein the raising a question according to the current time and the called voice program, and playing the called voice program comprises:
    playing the called voice program first, and then raising a question according to the current time and the called voice program after the called voice program is played, or
    raising the question according to the current time and the called voice program first, and then playing the called voice program after the question is raised, or
    raising the question according to the current time and the called voice program while the called voice program is played.

10. The apparatus for a voice interaction according to claim 6, wherein the raising a question according to the current time and the called voice program comprises:
    raising a question corresponding to the called voice program when the current time is not within a preset period of time; and
    raising a question corresponding to the called voice program and the preset period of time when the current time is within the preset period of time.

* * * * *

UNITED STATES PATENT AND TRADEMARK OFFICE
CERTIFICATE OF CORRECTION

PATENT NO. : 11,341,967 B2
APPLICATION NO. : 16/812110
DATED : May 24, 2022
INVENTOR(S) : Dongli Liu It is certified that error appears in the above-identified patent and that said Letters Patent is hereby corrected as shown below:

On the Title Page

Column 1, Item (73), Lines 1-2, under Assignee, delete:
"Baidu Online Network Technology (Beijing) Co., Ltd., Beijing (CN)" and insert:
--Baidu Online Network Technology (Beijing) Co., Ltd., Beijing (CN); Shanghai Xiaodu Technology Co., Ltd.--.

Signed and Sealed this
Twenty-third Day of May, 2023

Katherine Kelly Vidal
*Director of the United States Patent and Trademark Office*